(12) United States Patent
Feichtinger et al.

(10) Patent No.: US 8,730,645 B2
(45) Date of Patent: May 20, 2014

(54) MULTILAYER ELECTRICAL COMPONENT

(75) Inventors: Thomas Feichtinger, Graz (AT); Axel Pecina, St. Martin (AT)

(73) Assignee: EPCOS AG, Munich (DE)

( * ) Notice: Subject to any disclaimer, the term of this patent is extended or adjusted under 35 U.S.C. 154(b) by 765 days.

(21) Appl. No.: 12/650,206

(22) Filed: Dec. 30, 2009

(65) Prior Publication Data

US 2010/0157505 A1 Jun. 24, 2010

Related U.S. Application Data

(63) Continuation of application No. PCT/EP2008/058594, filed on Jul. 3, 2008.

(30) Foreign Application Priority Data

Jul. 6, 2007 (DE) .......................... 10 2007 031 510

(51) Int. Cl.
*H01G 4/30* (2006.01)

(52) U.S. Cl.
USPC ...................................... 361/301.4

(58) Field of Classification Search
USPC ........ 361/301.4, 306.3, 321.4, 311, 800, 312, 361/816
See application file for complete search history.

(56) References Cited

U.S. PATENT DOCUMENTS

| | | | |
|---|---|---|---|
| 4,302,362 A | 11/1981 | Hoffman et al. | |
| 4,460,497 A | 7/1984 | Gupta et al. | |
| 4,766,412 A | 8/1988 | Takakura et al. | |
| 4,774,148 A * | 9/1988 | Goto ............................. | 428/607 |
| 5,412,357 A | 5/1995 | Nakamura et al. | |
| 5,583,738 A * | 12/1996 | Kohno et al. ................. | 361/312 |
| 5,870,273 A | 2/1999 | Sogabe et al. | |
| 6,376,085 B1 | 4/2002 | Oobuchi et al. | |
| 6,608,547 B1 | 8/2003 | Greier et al. | |
| 7,263,244 B2 | 8/2007 | Tanaka et al. | |
| 7,443,267 B2 | 10/2008 | Saito et al. | |
| 7,649,435 B2 * | 1/2010 | Moriai et al. .................... | 338/21 |
| 7,737,818 B2 | 6/2010 | Djordjevic et al. | |
| 2002/0021561 A1 | 2/2002 | Yamauchi et al. | |
| 2002/0125547 A1 | 9/2002 | Kawase et al. | |
| 2004/0061568 A1 | 4/2004 | Ishida et al. | |
| 2006/0077646 A1 | 4/2006 | Ahn et al. | |
| 2006/0215350 A1 | 9/2006 | Tonogai et al. | |
| 2010/0014213 A1 | 1/2010 | Wozniak et al. | |
| 2010/0157505 A1 | 6/2010 | Feichtinger et al. | |

FOREIGN PATENT DOCUMENTS

| | | | |
|---|---|---|---|
| DE | 37 17 157 A1 | 11/1987 | |
| DE | 199 31 056 B4 | 1/2001 | |
| DE | 100 64 445 A1 | 7/2002 | |
| DE | 102 24 565 A1 | 12/2003 | |
| DE | 10224565 * | 12/2003 | ............... H01C 7/18 |
| DE | 100 26 258 B4 | 3/2004 | |
| DE | 699 08 445 T2 | 5/2004 | |
| DE | 103 56 498 A1 | 7/2005 | |

(Continued)

*Primary Examiner* — Robert J Hoffberg
*Assistant Examiner* — Hung Dang
(74) *Attorney, Agent, or Firm* — Slater & Matsil, L.L.P.

(57) ABSTRACT

A multilayer electrical component is presented having at least one base body, which includes a stack of dielectric layers and electrode layers arranged one upon the other, wherein the multilayer component additionally has a resistor and a decoupling layer, wherein the decoupling layer chemically isolates the resistor from at least one portion of a multilayer element.

20 Claims, 4 Drawing Sheets

(56) References Cited

FOREIGN PATENT DOCUMENTS

| | | |
|---|---|---|
| DE | 10 2004 045 009 A1 | 4/2006 |
| DE | 10 2005 025 680 A1 | 4/2006 |
| DE | 10 2005 050 638 A1 | 6/2007 |
| EP | 1 538 641 A2 | 6/2005 |
| JP | 05-275958 A | 10/1993 |
| JP | 08-265083 A | 10/1996 |
| JP | 11-340039 A | 12/1999 |
| JP | 2000-164461 A | 6/2000 |
| JP | 2001-307910 A | 11/2001 |
| JP | 2002-025857 A | 1/2002 |
| JP | 2002-033634 A | 1/2002 |
| JP | 2002-118033 A | 4/2002 |
| JP | 2002118033 * 4/2002 ............... H01G 4/40 |
| JP | 2006-135141 A | 5/2006 |
| KR | 1020050080823 A | 8/2005 |

* cited by examiner

MULTILAYER ELECTRICAL COMPONENT

This application is a continuation of co-pending International Application No. PCT/EP2008/058594, filed Jul. 3, 2008, which designated the United States and was not published in English, and which claims priority to German Application No. 10 2007 031 510.6 filed Jul. 6, 2007, both of which applications are incorporated herein by reference.

TECHNICAL FIELD

A multilayer electrical component is described having, for example, a multilayer capacitor or a multilayer varistor.

BACKGROUND

A multilayer electrical component is known from the German patent DE 10224565 A1. Multilayer capacitors that are arranged opposite each other in a base body are connected to a common ground electrode implemented on a front side of the base body.

From the German patent DE 10356498 A1, a multilayer component is known wherein an interconnecting structure connects two electrode stacks together, and wherein two symmetry levels are present in the component; one of the symmetry layers runs parallel to a ceramic layer and the other perpendicular to a ceramic layer.

SUMMARY

In one aspect, the invention provides an electrical component that has high integration density with minimal interaction by circuit elements present in the component.

A multilayer electrical component includes at least one base body including a stack of dielectric layers and electrode layers arranged on top of each other. In addition, the multilayer component includes a resistor or a resistor structure and a decoupling layer that chemically isolates the resistor from at least one portion of the multilayer component, in particular, the base body. According to one embodiment, the decoupling layer is applied on an outer surface of the base body.

In this way it is advantageously attained that the material of the one portion of the multilayer component that is isolated by means of the decoupling layer does not react chemically with the carrier material of the resistor, or directly with the resistor. Thus, the desired properties of the resistor can be adjusted with minimum effort. This can be done, for example, by imprinting a specific resistor structure on the decoupling layer, which can also be regarded as the carrier layer, wherein the material properties and the path or the track of a structure remain unchanged during the production, or during the heat treatment of the multilayer element, as well as during its initial operation.

According to one embodiment, the multilayer component has a decoupling layer on the top, as well as on the bottom side. Here, a decoupling layer could be arranged in each case on the top and on the bottom of the base body. A decoupling layer on the bottom of the multilayer component has the advantage that it chemically decouples a material contained in the base body from that of a substrate on which the multilayer component could be mounted.

According to one embodiment of the multilayer component, the at least one decoupling layer contains a zirconium oxide glass composite. The use of this material as a component of the decoupling layer has the advantage that it enables the creation of a decoupling layer that has a comparatively smooth surface, which can be imprinted with particularly detailed and precise resistor structures. In addition, it has been shown that the use of metal oxides and/or of nitrides with or without the zirconium oxide glass composite is particularly favorable with respect to the most complete chemical decoupling properties of the decoupling layer.

According to an advantageous embodiment, the at least one decoupling layer has a stray capacitance reducing function. Here, the decoupling layer can contain a material that at least reduces the propagation or the transfer of stray capacitances between the one specified portion of the multilayer component and the resistor. For this purpose, it was determined experimentally that along with the zirconium oxide glass composite ($ZrO_x$ glass composite; $x \geq 1$), other materials are also suitable, for example, a magnesium oxide glass composite ($MgO_x$ glass composite; $x \geq 1$), an aluminum oxide glass composite ($AlO_x$ glass composite; $x \geq 1$) or a mixture of the specified glass composites with a zirconium oxide glass composite. Furthermore, other materials, such as $Zn_2MnO_4$, as well as other representatives of the $A_2BO_4$ family, wherein A and B in each case comprise, in particular, bivalent metal cations, can be present in the decoupling layer.

It is preferable that the at least one decoupling layer contains a chemical decoupling material, or is composed for the most part of a decoupling material having a dielectric permittivity of less than 15. In this way, a particularly effective stray capacitance reducing effect is attained. Advantageously, due to such a low dielectric permittivity, the decoupling layer is particularly effective with respect to isolating parasitic effects that can occur, for instance, in the high frequency range. Here, the multilayer component has the advantage that electromagnetic interactions between the resistor and a portion of the multilayer component, which could have different electrical properties brought about by circuit elements, such as capacitors, resistors, or also semiconductor layers, can be avoided or at least reduced.

The resistor according to one embodiment of the multilayer component can be applied at least partially on at least one outer surface of the decoupling layer. Here, the resistor can be applied on top of a surface of the decoupling layer. If the decoupling layer forms the top layer of the multilayer component, the resistor should be considered as being arranged on the top surface of the multilayer component.

The application of a resistor or of a resistor structure on at least one face outer surface of the multilayer component has the advantage that no further layers of the multilayer component above or below the resistor in the direction of the stack can lead to a change of its electrical properties.

According to a preferred embodiment of the multilayer component, the resistor is arranged at least partially on electrical conductor paths, to which connections are possible from the outside. Here, the electrical conductor paths can be arranged at least partially on the outer surface of the base body or of the multilayer component. In the following, these electrical conductor paths are also designated as resistor pads. The electrical conductor paths are preferably in electrical contact with outer contacts of the multilayer component, which can be implemented as layers.

It is preferable that the resistor is covered at least partially with a first passivation layer. If the resistor is arranged on the top outer layer of the multilayer component, then the first passivation layer forms the top layer of the multilayer component relative to its stack direction. This first passivation layer, according to one embodiment, contains glass. However, other materials that impede a chemical reaction with the material of the resistor or with the surface of the base body, can also be used.

Also, the multilayer component according to one embodiment is formed such that at least a part of the outer surface of the multilayer component is covered with a second passivation layer. Here, the second passivation layer also could contain glass.

The first and second passivation layers are preferably arranged on different outer surfaces of the base body. Here, for example, the first passivation layer could be applied on the top side of the base body, in particular, on the outer surface of the resistor, wherein the second passivation layer, in contrast, could be arranged on the side surfaces and on the bottom side of the base body. Here it is particularly preferable that a passivation layer that preferably contains glass is arranged between the base body and outer electrodes applied laterally on the base body.

According to one embodiment of the multilayer component, the base body includes a plurality of stacks arranged laterally next to each other, where the stacks consist of electrode layers arranged on top of each other. Here, electrode layers can lie on common dielectric layers. Thus, a multilayer component is specified that includes an array of electrode stacks.

Preferably, the base body has a plurality of outer contacts on the various side surfaces thereof that in each case are in contact with electrode layers of the same polarity.

According to one embodiment, the part of the base body from which the resistor is chemically isolated by means of the decoupling layer includes a varistor body and/or a capacitor body.

According to one embodiment of the multilayer component, an electromagnetic shielding structure, which electromagnetically decouples the resistor from at least a part of the base body, is integrated into the base body. This shielding structure could be an electrically conducting layer without outside or external contact. Therefore, this shielding structure is also called a "floating" electrode.

According to one embodiment, the electromagnetic shielding structure is integrated into the at least one decoupling layer itself. Instead, however, it could also be surrounded by chemically decoupling material.

According to one embodiment, the base body has a ground electrode. Preferably, the electrode is in contact with an outer contact of the multilayer component at each of two ends. According to one embodiment, a plurality of ground electrodes could be arranged above one another in the stack direction in the multilayer component, where the ground electrodes alternate with electrode layers and dielectric layers.

According to one embodiment, it is provided that a capacitance is created by adjacent electrode layers that overlap each other in orthogonal projections and a dielectric layer lying in between them.

The dielectric layer could contain a capacitor ceramic wherein a multilayer capacitor is formed by a plurality of capacitances arranged above one another.

An additional passivation layer can be arranged between at least two capacitances that are arranged or present above one another. A plurality of capacitances in the multilayer component can thereby be advantageously electromagnetically decoupled from each other. In this regard, at least one such passivation layer can also be arranged between a plurality of capacitors, or between two multilayer capacitors each.

According to one embodiment, one or a plurality of dielectric layers of the multilayer component contain a varistor ceramic. Thus, a plurality of capacitances arranged above one another can be formed in a multilayer varistor.

Multilayer capacitors and multilayer varistors of the described type can be arranged above one another in multilayer components, wherein they can be chemically or electromagnetically decoupled from each other by means of a decoupling layer and/or an electromagnetic shielding structure.

It is preferable that the arrangement of dielectric layers and electrode layers of the multilayer component are symmetrical with respect to a lateral plane, which runs parallel to the dielectric layers. In addition, or alternatively, the arrangement of dielectric layers and electrode layers can be implemented symmetrically relative to a plane that runs perpendicular to the dielectric layers or in the direction of the stack. In both cases it is preferable that the shape of the electrode layers, for example, also the shape of the ground electrodes, are likewise implemented symmetrically with respect to the named plane. The form of the resistor, or of the resistor structure, could be symmetrical relative to the plane running perpendicular to the dielectric layers. If the multilayer component has a plurality of resistor structures on a plurality of planes relative to the direction of the stack, then these resistor structures can also be symmetrical relative to the symmetry planes that run parallel to the dielectric layers.

BRIEF DESCRIPTION OF THE DRAWINGS

The described subjects are explained in more detail in the following, based on the figures and exemplary embodiments.

The following list of reference symbols may be used in conjunction with the drawings:
  1 Base body
  2 Dielectric layer
  3 Electrode layer
  4 Resistor
  4a Resistor pad
  5a First decoupling layer
  5b Second decoupling layer
  6 Outer contact
  7a First passivation layer
  7b Second passivation layer 8 Electromagnetic shielding structure
9 Ground electrode

DETAILED DESCRIPTION OF ILLUSTRATIVE EMBODIMENTS

Figure 1:
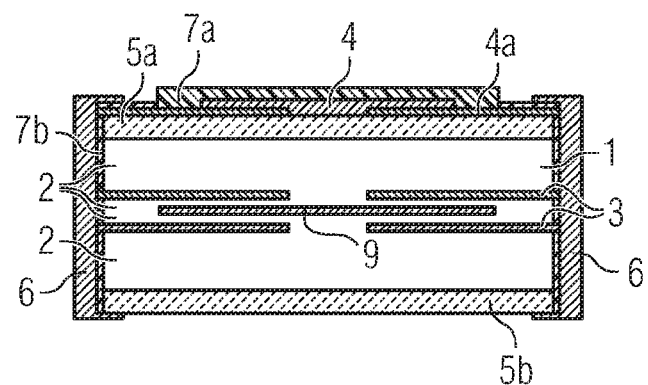
FIG. 1 shows a lateral cross-sectional view of an electrical multilayer component having a resistor structure applied on a decoupling layer arranged on the top side, and a passivation layer covering the resistor structure.

FIG. 1 shows a lateral cross-sectional view of a multilayer electrical component with a base body 1 which has a stack of dielectric layers 2 and electrode layers 3 arranged on top of each other. A common ground electrode 9 is arranged between electrodes layers 3 that are arranged above each other. The top side of the base body 1 is provided with a chemical decoupling layer 5a, wherein the bottom side of the base body is provided with another decoupling layer 5b. That could have a chemically decoupling effect. It is preferable, however, that this decoupling layer 5b on the bottom side has an electromagnetically decoupling effect, so that the lowest possible electromagnetic fields penetrate into the multilayer component from a circuit board, upon which the multilayer component could be arranged.

Outer contacts 6 are present, which are arranged on opposite side surfaces of the base body 1, wherein the outer contacts are preferably designed as metalized layers or as elongated strips in the direction of the stack of the multilayer component. A passivation layer 7b is present between an outer contact 6 and the side surface of the base body 1.

One of the ends of each of the electrode layers 2 are brought up to an outer contact 6 in order to produce an electrical contact with it. The outer contacts 6 are preferably cap-shaped in design, wherein they each have a form clasping laterally around the multilayer component.

On the top side, the multilayer electrical component has conductor paths or resistor pads 4a that are applied on the top side of the upper decoupling layer 5a, and which partially cover its surface. In addition, in an area of the surface of the decoupling layer, a resistor structure 4 is applied alongside the resistor pads 4a, wherein the resistor structure 4 contacts both the surface of the decoupling layer 5a as well as the surfaces of the resistor pads 4a. A passivation layer 7a preferably completely covers the top side of the resistor structure. Here, the passivation layer 7a could also cover at least a part of the surfaces of the resistor pads 4a.

The decoupling layer 5a reduces the crosstalk between the resistor 4 and the electrode layers 3 contained in the base body 1 as well as the ground electrode 9.

The base body 1 contains a functional ceramic, for instance, a varistor or a capacitor ceramic, in which electrode stacks are arranged that are connected to the outer contacts 6 and form a least a capacitance and at least a varistor or a capacitor.

Preferably, the decoupling layers 5a and 5b contain a composite containing zirconium oxide and glass, wherein the decoupling layers 5a and 5b can be sintered together with the base body 1 or with the functional ceramic.

Figure 2:
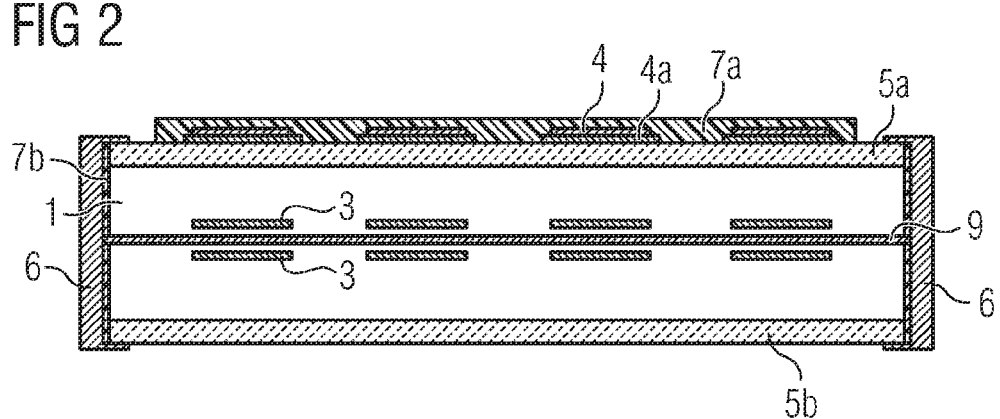
FIG. 2 shows another lateral cross-sectional view of the multilayer component according to FIG. 1.

FIG. 2 shows a lateral cross-sectional view of the multilayer component already shown in FIG. 1, wherein the cross-section of this figure runs perpendicular to that of FIG. 1. In this view a plurality of stacks of electrode layers 3 are shown that are arranged alongside each other in a lateral direction. A ground electrode 9 connects two outer contacts 6 that are located opposite each other and that are each applied on side surfaces of the multilayer component or the base body 1, wherein the ground electrode 9 is arranged between two electrode layers 3 each of the several electrode stacks arranged alongside each other. On the top side of the surface of the decoupling layer 5a, a plurality of resistor pads 4a and resistors 4, arranged at least partially on the resistor pads 4a, are shown wherein each resistor 4 connects together two opposite located resistor pads, and each of the resistor pads is, at one end, contacting an outer contact 6 applied on a side surface of the base body 1. A passivation layer 7a, preferably containing glass, completely covers the top side of the resistors 4 and the resistor pads 4a.

Figure 3A:
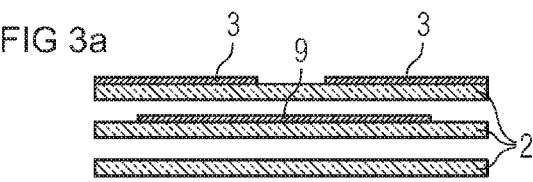
FIGS. 3A to 3J show different steps, or points in time during the production of a multilayer component of the described type.

FIG. 3A shows a plurality of dielectric layers 2, which are stacked on top of each other, wherein a dielectric layer is imprinted with a ground electrode structure or with a ground electrode 9, and a further dielectric layer 2 is imprinted with two electrode layers 3, which are separated from each other by a distance in the center region of the dielectric layer. The electrode layers 3 project beyond the dielectric layers on which they lie, with their ends that are to contact the outer contacts 6, in such a way that after the lamination of the dielectric layer, they project a short way from the base body 1 produced this way.

Figure 3F:
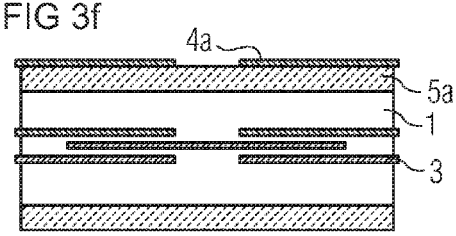
Figure 3B:
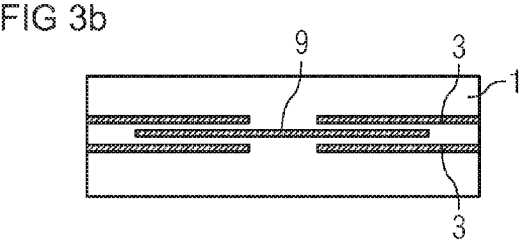

FIG. 3B shows the laminated state of the different layers of the base body shown in FIG. 3A.

Figure 3G:
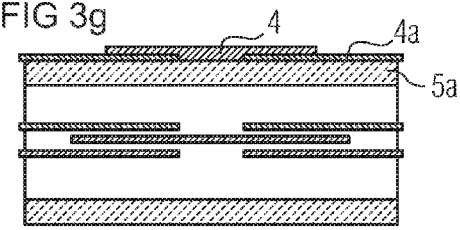
Figure 3C:
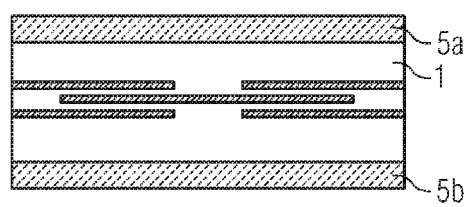

FIG. 3C shows the base body 1 according to FIG. 3B that has a decoupling layer 5a provided on the top and a decoupling layer 5b provided on the bottom.

Figure 3H:
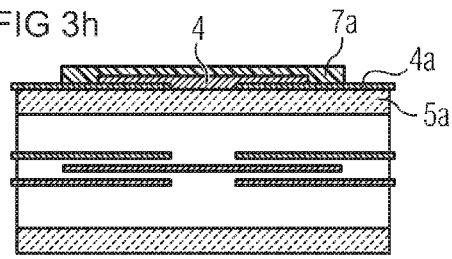
Figure 3D:
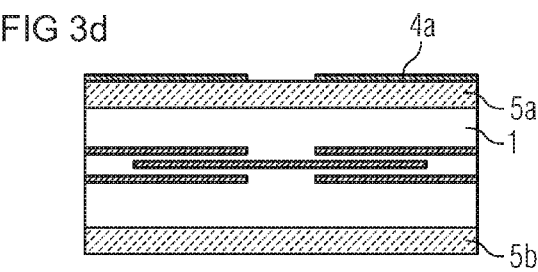

FIG. 3D shows the base body 1 provided with the decoupling layers 5a, 5b on the top and bottom, wherein the upper decoupling layer 5a is further provided with resistor pads 4a that lie across from each with a separation and that can make contact with an outer contact 6 at one end.

Figure 3I:
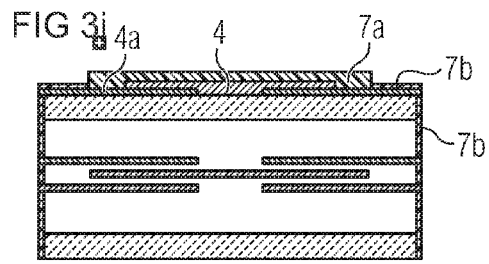
Figure 3E:
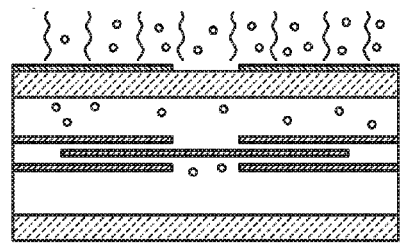

FIG. 3E shows a body of a multilayer component according to FIG. 3D, with the difference that the debinding process for the removal of organic binder contained in the ceramic layers 2 is represented schematically in this Figure. An organic binder could be contained in the ceramic layers 2, in order to make them more manageable for lamination in a base body 1.

FIG. 3F shows the body according to the FIGS. 3D and 3E, whose side surfaces have been milled off by a suitable tool in such a way that the ends of the electrode layers 3 and those of the resistor pads 4a extend a short way out of the base body 1, or in the case of resistor pads project somewhat beyond the upper decoupling layer 5a.

FIG. 3G shows the multilayer component body according to FIG. 3F, wherein a resistor 4 connects the resistor pads 4a that lie across from each with a separation on the surface of the decoupling layer 5a. Here, the resistor 4, or the resistor structure 4, is in contact both with the surfaces of the resistor pads 4a, as well as with a portion of the surface of the decoupling layer 5a.

FIG. 3H shows the multilayer component body according to FIG. 3G, wherein both the resistor 4 as well as at least a portion of the surface of the resistor pads 4a are covered by means of a passivation layer 7a.

FIG. 3I shows the multilayer component body according to FIG. 3H, wherein an additional passivation layer 7b is applied on the side surfaces of the body, as well as on the surface region of the resistor pads 4a that is not covered by the passivation layer 7a or by the resistor 4. The additional passivation layer 7b is applied laterally on the multilayer component body in such a way that the previously projecting resistor pads and electrode layers 3 no longer project due to the additional lateral coating with the passivation layer, and a planar side surface or planar side surfaces of the multilayer component are created.

Figure 3J:
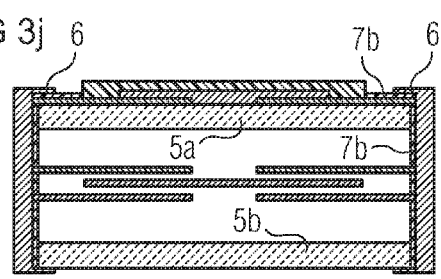

FIG. 3J shows the multilayer component body according to FIG. 3I, with the additional feature, according to which outer contacts 6 have a form clasping laterally around the body. Here, the previously applied passivation layer 7b remains intact preferably between the outer contacts 6 and the outer surface of the base body, or the decoupling layers 5a and 5b.

Figure 4A:
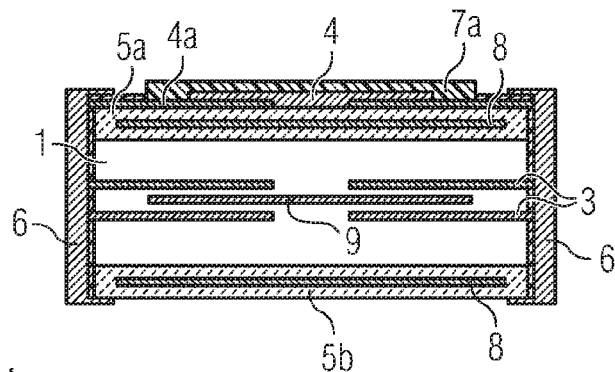
FIG. 4A shows a lateral cross-sectional view of a multilayer electrical component according to FIG. 1, however, in addition having an electromagnetic shielding structure, and several decoupling layers.

FIG. 4A shows a lateral cross-sectional view of a multilayer electrical component, whose base body 1 is provided on the top and bottom, respectively, with a decoupling layer, 5a 5b. A shielding electrode 8 is arranged in each decoupling layer, and can be considered as a floating electrode or as a metallic surface that is not in contact with the outside. Beyond that, the multilayer component is built according to the FIGS. 3A to 3B and the associated description.

Figure 4B:
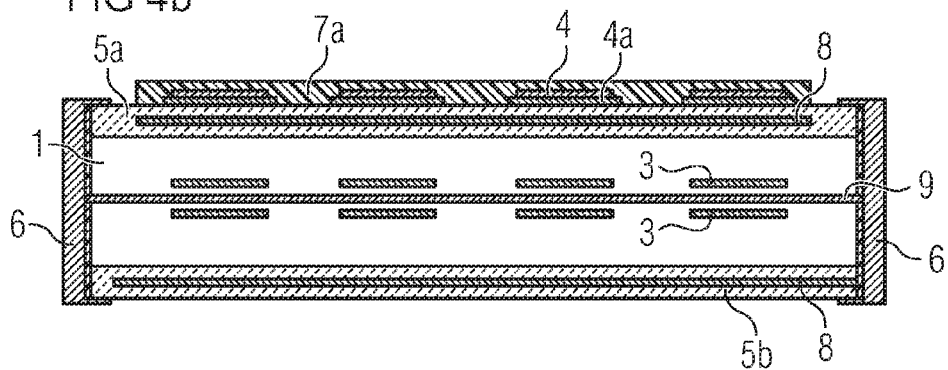
FIG. 4B shows another lateral cross-sectional view of the multilayer component according to FIG. 4A.

FIG. 4B shows another lateral cross-sectional view of the multilayer component shown in FIG. 4A, wherein the cross-sectional plane runs perpendicular to that of FIG. 4A. Shielding structures 8 running along the longitudinal axis of the multilayer component are shown that respectively are contained in the decoupling layers 5a, 5b.

The shielding structures 8 can to a great extent advantageously decouple, in particularly electromagnetically, the resistors 4 arranged on the top side of the multilayer component from the base body 1, or at least from a portion of the base body. The decoupling layer 5b arranged on the bottom of the base body can electromagnetically decouple the base body or a portion of the base body 1, if need be, from conductor paths arranged on a mounting surface or printed circuit board on which the multilayer component could be placed.

The use of a floating electrode 8 in at least one of the decoupling layers 5a, 5b contributes, for example, in the case of high-frequency use of the multilayer component, to a particularly advantageous filter behavior.

Figure 5A:
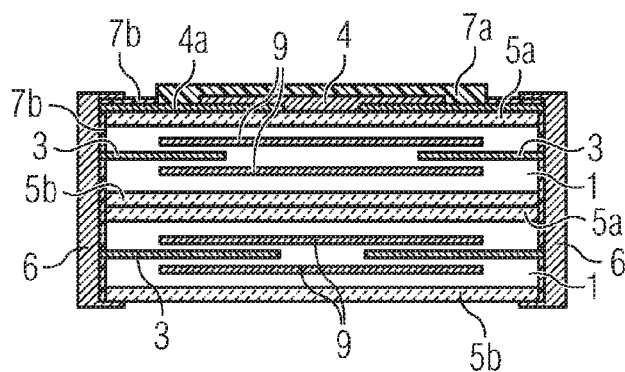
FIG. 5A shows a lateral cross-sectional view of a multilayer electrical component comprising two stacks of electrodes layers and dielectric layers arranged on top of each other, which are decoupled from each other by means of a passivation layer.

FIG. 5A shows a lateral cross-sectional view of a multilayer electrical component, with a plurality of base bodies 1 arranged on top of each other, which are in each case provided with a decoupling layer 5a and 5b respectively, on the top and the bottom. Each base body has a plurality of stacks of electrode layers 3, wherein a ground electrode 9 can be arranged between each of two electrode layers of a stack. Because the bottom decoupling layer 5b of the upper base body 1 abuts on the upper decoupling layer 5a of the lower base body 1, an arrangement is created of adjacent decoupling layers 5a, 5b in the direction of the stack, which enables a particularly thorough electromagnetic decoupling of the various base bodies 1 formed with the electrode stack. The arrangement of base bodies arranged on top of each other, with upper and lower decoupling layers, respectively, in each case, could be multiplied in the direction of the stack based on the same pattern.

For example, a first base body 1 with, respectively, a plurality of stacks of electrode layers and ground electrodes 9, could include a varistor body, wherein a further base body 1, adjacent in the stack direction, also having a stack of electrode layers 3 and ground electrodes 9, could include a further varistor or body or, for example, a capacitor or a multilayer capacitor. Because the named base bodies can be chemically and/or electromagnetically decoupled from each other by means of the decoupling layers 5a, 5b, a multilayer component can be created with several functions with a high degree of integration density with respect to the circuit elements or functional ceramics arranged in the multilayer component.

On the outside of the multilayer component, passivation layers 7a, 7b, outer contacts 6, as well as resistor pads 4a and resistors 4 are built according to the preceding Figures and partial descriptions.

Figure 5B:
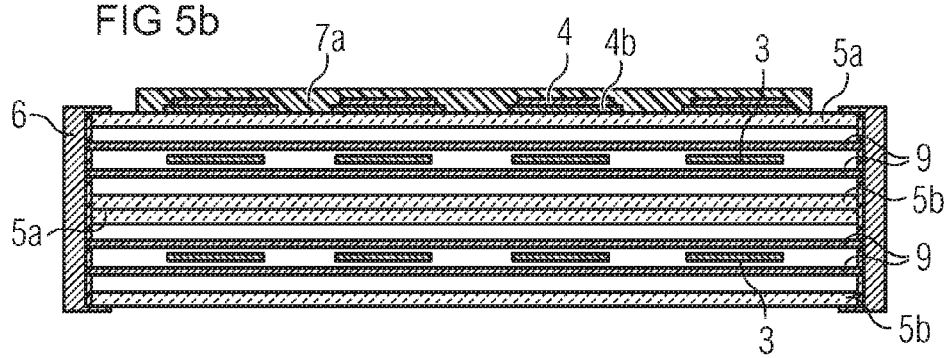
FIG. 5B shows a lateral cross-sectional view of the multilayer component according to FIG. 5A.

FIG. 5B shows a further lateral cross-sectional view of the multilayer component shown in FIG. 5A, wherein the plane of the cross-section runs perpendicular to that of the multilayer component according to FIG. 5A. Thus, in a top view, the ends of several electrode layers 3 are shown that are arranged laterally next to each other in each base body 1, but interact with the common ground electrodes 9.

Figure 6A:
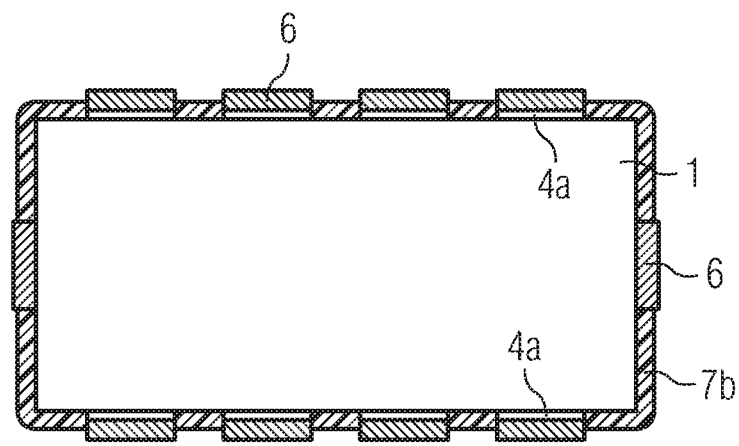
FIG. 6A shows a top view of a multilayer electrical component of the described type with a plurality of outer electrical contacts.

FIG. 6A is a top view of a multilayer electrical component according to one of the preceding figures and the respectively associated description sections, wherein two outer contacts 6 are located on different side surfaces that are located opposite each other in the longitudinal direction of the multilayer component. These outer contacts 6 preferably contact both one and the same ground electrode 9, wherein several such ground electrodes 9 can be arranged above one another in the stack direction.

On the other side surfaces of the multilayer component, in each case, four outer contacts 6 are arranged, which are located opposite each other in the direction running perpendicular to the longitudinal direction. Preferably, a passivation layer 7b is applied between the outer contacts along the outer surface of the base body 1, the layer diminishing or at least reducing outer influences on the surface properties of the base body, or a change of the surface properties of the base body due to outer influences.

Figure 6B:
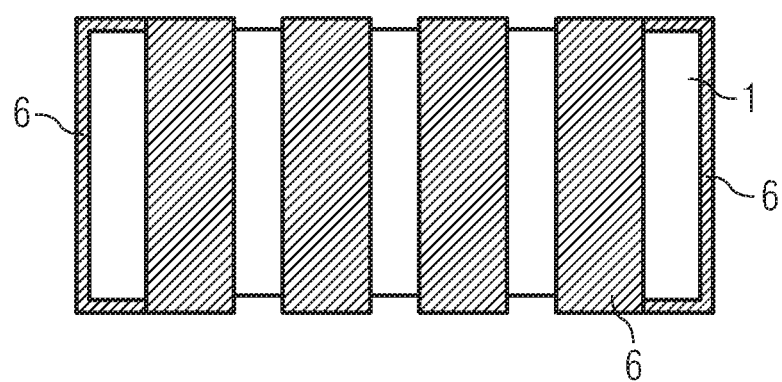
FIG. 6B shows a lateral cross-sectional view of the multilayer component shown in FIG. 6A.

FIG. 6B is a lateral cross-sectional view of a multilayer component according to one of the preceding figures, wherein in this case the cross-section is repositioned further toward the outside such that the outer contacts 6, which are arranged on the longitudinal sides of the multilayer component, are visible. It is shown how the outer contacts 6 extend beyond the height of the base body, and project beyond the height of the base body 1 on the top as well as on the bottom by a small amount, wherein they have inwardly directed shoulders or projections in this region, which are each arranged partially on the top surface of the front faces of the multilayer elements, whereby a clamp-like shape is formed for each outer contact.

A functional ceramic of a multilayer component of the described type can contain different materials, depending on the intended use of the multilayer component. For example, in the case of use of the multilayer component as an EMI (electromagnetic impulse) filter, the use of capacitor materials that are from the classes COG, X7R, Z5U, Y5V, KQM is preferred. If the multilayer component is used as a varistor, the functional ceramic includes preferably ZnO—B, ZnO—Pr or a mixture thereof. Here, it is particularly favorable if the multilayer component is used as an ESD (electrostatic discharge) or also as an EMI filter.

Each of the described electrode layers can contain one of the following materials or a combination or alloy of the following materials: silver, palladium, platinum, silver-palladium alloys, silver-platinum alloys, copper, nickel. Here it is favorable if the outer contacts of the multilayer component have a material that is used for an electrode layer contacting the outer contact.

What is claimed is:

1. An electrical multilayer component comprising:
a base body comprising a stack of dielectric layers and electrode layers arranged above one another;
a resistor arranged at least partially on electrical conductor paths which are in contact with outer contacts of the multilayer component; and
a decoupling layer on a top and a bottom of the base body, wherein the decoupling layer chemically isolates the resistor from at least a portion of the multilayer component, wherein the decoupling layer comprises a material selected from the group consisting of zirconium oxide glass composite ($ZrO_x$ glass composite; $x \geq 1$), magnesium oxide glass composite ($MgO_x$ glass composite; $x \geq 1$), aluminum oxide glass composite ($AlO_x$ glass composite; $x \geq 1$), a mixture thereof, and $Zn_2MnO_4$.

2. The electrical multilayer component according to claim 1, wherein the decoupling layer has a stray capacitance reducing function.

3. The electrical multilayer component according to claim 1, wherein the resistor is applied at least partially on at least one outer surface of the base body.

4. The electrical multilayer component according to claim 3, further comprising a first passivation layer wherein the resistor is covered at least partially with the first passivation layer.

5. The electrical multilayer component according to claim 4, further comprising a second passivation layer wherein at least one portion of the at least one outer surface of the base body is covered with the second passivation layer.

6. The electrical multilayer component according to claim 1, further comprising an electrically contactless electromagnetic shielding structure that electromagnetically decouples the resistor from at least a portion of the multilayer component, the shielding structure being integrated in the multilayer component.

7. The electrical multilayer component according to claim 6, wherein the electromagnetic shielding structure is integrated in the decoupling layer.

8. The electrical multilayer component according to claim 6, wherein the electromagnetic shielding structure comprises an electrically conducting layer.

9. The electrical multilayer component according to claim 1, further comprising a ground electrode arranged in the base body.

10. The electrical multilayer component according to claim 1, wherein the portion of the base body, from which the resistor is isolated by means of the decoupling layer, comprises a varistor body.

11. The electrical multilayer component according to claim 1, wherein the portion of the base body from which the resistor is chemically isolated by means of the decoupling layer comprises a capacitor body.

12. The electrical multilayer component according to claim 1, wherein the base body comprises a multilayer capacitor and a multilayer varistor that are decoupled from each other by the decoupling layer.

13. The electrical multilayer component according to claim 1, wherein the stack of dielectric layers and electrode layers is symmetrical with respect to a plane running parallel to each of the dielectric layers.

14. The electrical multilayer component according to claim 1, wherein the stack of dielectric layers and electrode layers is symmetrical with respect to a plane running in a direction of the stack.

15. The electrical multilayer component according to claim 1, that is designed as an array, wherein the base body comprises a plurality of stacks arranged laterally alongside each other, each stack having dielectric layers and electrode layers, arranged above one another.

16. An electrical multilayer component comprising:
a base body comprising a stack of dielectric layers and electrode layers arranged above one another;
a resistor arranged at least partially on electrical conductor paths which are in contact with outer contacts of the multilayer component;
a decoupling layer that chemically isolates the resistor from at least a portion of the multilayer component; and
an electrically contactless electromagnetic shielding structure that electromagnetically decouples the resistor from at least a portion of the multilayer component, the shielding structure being integrated in the multilayer component, wherein the shielding structure is either integrated in the at least one decoupling layer itself or surrounded by chemically decoupling material.

17. The electrical multilayer component according to claim 16, wherein the decoupling layer has a stray capacitance reducing function.

18. The electrical multilayer component according to claim 16, wherein the resistor is applied at least partially on at least one outer surface of the base body.

19. The electrical multilayer component according to claim 18, further comprising a first passivation layer wherein the resistor is covered at least partially with the first passivation layer.

20. The electrical multilayer component according to claim 19, further comprising a second passivation layer wherein at least one portion of the at least one outer surface of the base body is covered with the second passivation layer.

* * * * *